Feb. 18, 1964   H. W. BAKER, JR   3,121,398
ROTARY MOTOR AND PUMP
Filed April 18, 1960   10 Sheets-Sheet 1

INVENTOR.
HAROLD W. BAKER JR.
BY
ATTORNEY

Feb. 18, 1964   H. W. BAKER, JR   3,121,398
ROTARY MOTOR AND PUMP
Filed April 18, 1960   10 Sheets-Sheet 2

INVENTOR.
HAROLD W. BAKER JR.
BY
ATTORNEY

Feb. 18, 1964  H. W. BAKER, JR  3,121,398
ROTARY MOTOR AND PUMP
Filed April 18, 1960  10 Sheets-Sheet 3

INVENTOR.
HAROLD W. BAKER JR.
BY
ATTORNEY

INVENTOR.
HAROLD W. BAKER JR.

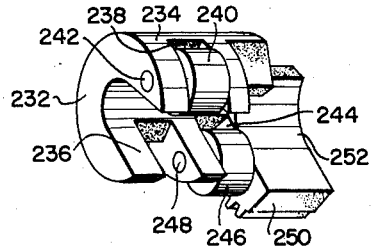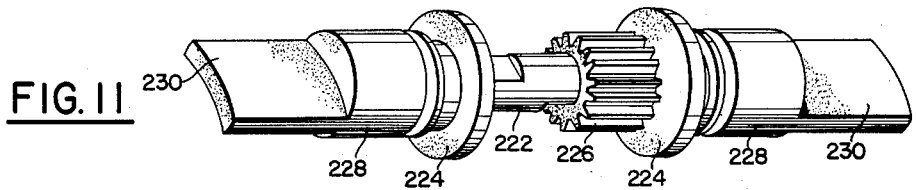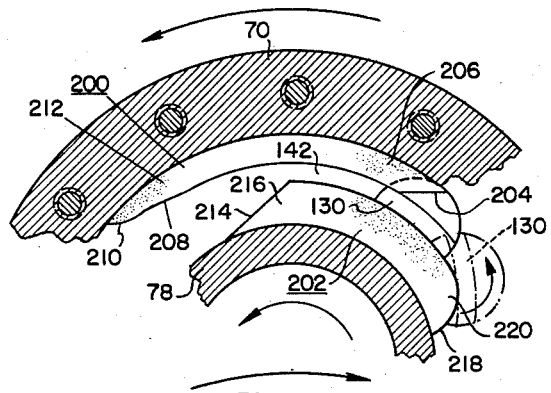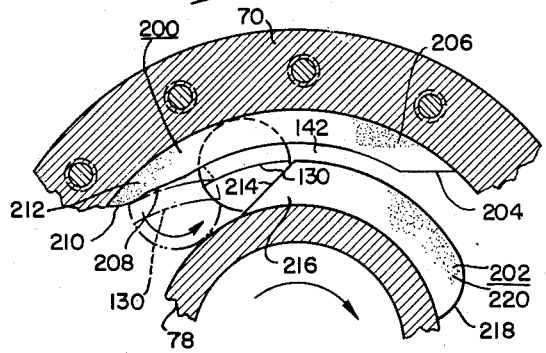

Feb. 18, 1964  H. W. BAKER, JR  3,121,398
ROTARY MOTOR AND PUMP
Filed April 18, 1960  10 Sheets-Sheet 8

INVENTOR.
HAROLD W. BAKER JR.
BY
ATTORNEY

Feb. 18, 1964 H. W. BAKER, JR 3,121,398
ROTARY MOTOR AND PUMP

Filed April 18, 1960 10 Sheets-Sheet 9

*INVENTOR.*
HAROLD W. BAKER JR.
BY
Busser, Smith & Harding
ATTORNEY

Feb. 18, 1964 H. W. BAKER, JR 3,121,398
ROTARY MOTOR AND PUMP
Filed April 18, 1960 10 Sheets-Sheet 10

INVENTOR.
HAROLD W. BAKER JR.
BY
ATTORNEY

United States Patent Office 3,121,398
Patented Feb. 18, 1964

3,121,398
ROTARY MOTOR AND PUMP
Harold W. Baker, Jr., % Roten, Incorporated,
P.O. Box 386, Bryn Mawr, Pa.
Filed Apr. 18, 1960, Ser. No. 22,995
10 Claims. (Cl. 103—140)

This invention relates generally to fluid motors, and particularly to improvements in a rotary fluid motor that is capable of functioning as a pump as well as a motor.

An important object of the invention is to mount the impeller vanes or blades of a rotary fluid motor upon shafts carried by a rotor for orbital movement about stationary cam means adapted for controlling and operatively orienting effectively each blade mounting shaft throughout a complete revolution of the rotor.

Another object of the invention is to provide such a motor wherein each blade shaft serves as a pivot for step-up driving means to a next adjacent blade shaft.

Another object of the invention is to provide such a motor with impeller blades and inlet and discharge passages arranged to effect hydraulic balance axially of the motor.

Another object of the invention is to provide such a motor with impeller blades lodged in a chamber having both inner and outer walls that rotate with the rotor so that very little clearance is required between the narrow opposite side edges of the impeller blades and the walls of the chamber.

Another object of the invention is to provide such a motor with a chamber having notched wall areas accommodating the impeller blades, the edges of impeller blades under load being engaged with said notched wall areas for positive support of said blades by said chamber walls.

Another object of the invention is to provide such a motor with a rotor assembly sealed against the ingress of fluids, in consequence of which the motor may be used as a pump for effectively handling non-lubricating fluids.

Another object of the invention is to provide such a motor with means for eliminating back-lash in the impeller blades.

Another object of the invention is to provide a rotary fluid pump with means for accelerating the liquid before it reaches the impellers of the pump, thereby to prevent cavitation.

Other objects of the invention will become apparent from the following description when read with reference to the accompanying drawings, in which:

FIGURES 9 and 10 illustrate a modification of the motor shown in FIGURES 1-8. They show back-lash eliminating cam means essential in high pressure units.

FIGURE 11 is a perspective view of a modified form of the impeller blade and shaft;

FIGURE 12 is a perspective view of a sleeve which is carried by the shaft shown in FIGURE 11;

Figure 1:
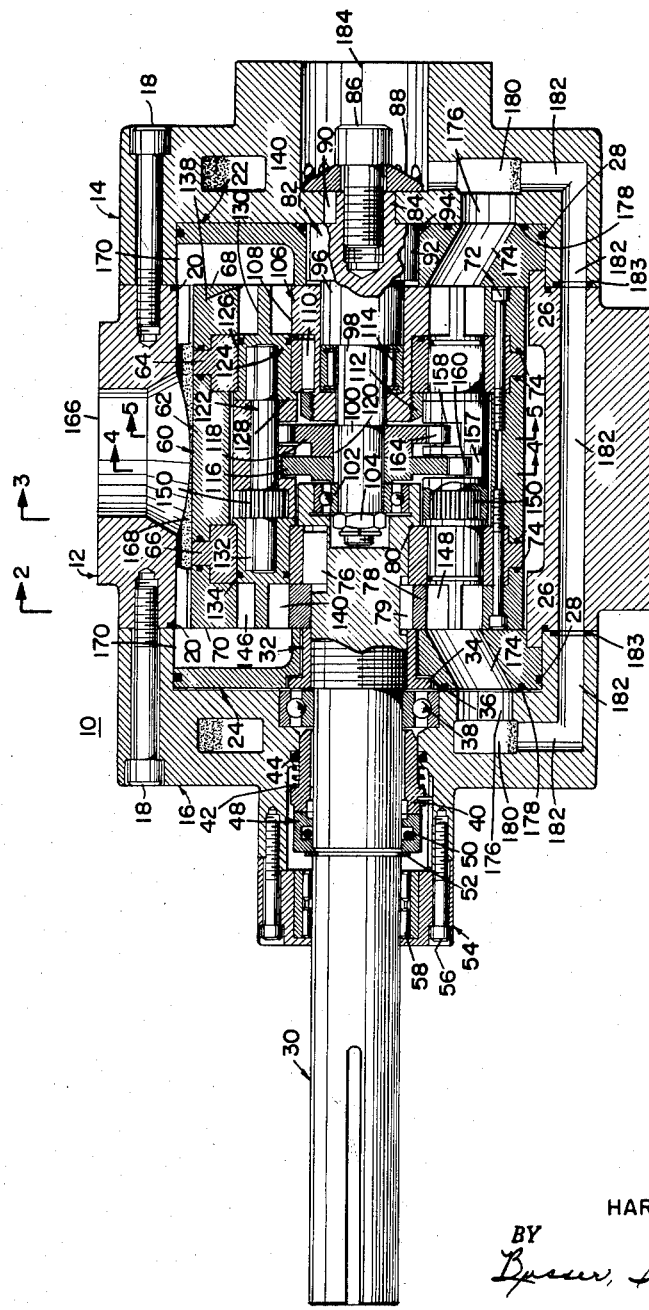
FIGURE 1 is a longitudinal section through the motor.

Referring to the drawings, and particularly to FIGURES 1 to 8, a motor constructed in accordance with the invention comprises a casing 10 having a generally cylindrical central section 12, an outboard end section 14 and an inboard end section 16, all being fastened together by studs 18, and an O-ring seal 20 being interposed between the central section and each of the end sections. Nested in the outboard end section 14 is a valve plate 22, and nested in the inboard end section 16 is a valve plate 24. At each end thereof the central section 12 is provided with a pair of arcuately shaped circumferentially spaced axially extending flanges 26 projecting into the associated end section. Each valve plate is fitted somewhat loosely between the central section 12 and the associated end section thereby to provide for slight floating movement of the valve plate axially of the unit. Dowels (not shown) affixed to the end sections and slidably projecting into the valve plates secure the valve plates against rotation. Interposed between each valve plate and the end section into which it is fitted is an O-ring seal 28.

Extending centrally through the casing section 16 and the valve plate 24 is a shaft 30. A nut 32 is threaded on the shaft and is provided with a radially outwardly extending flange 34 which is received in a circumferentially extending recess 36 formed in the valve plate 24. Fitted over the shaft 30 and disposed adjacent the nut 32 is a ball bearing unit 38, and next to the latter is a sleeve 40. Interposed between the sleeve 40 and the casing section 16 are a compression spring 42 and an O-ring seal 44. Next to the sleeve 40 is a collar 48 housing an O-ring seal 50. The sleeve 40 and collar 48 are secured against axial displacement by a retaining ring 52. A cap 54 is fitted over the shaft and secured to the casing section 16 by studs 56. The cap 54 houses a roller bearing unit 58.

The interior of the casing 10 accommodates a rotor 60 having a central rotor section 62, an outboard end plate 64, an inboard end plate 66, an outboard blade ring 68 and an inboard blade ring 70, all secured together as by studs 72. Interposed between the central rotor section 62 and each of the end plates 64 and 66, and between each of the latter and the associated blade ring is an O-ring seal 74. The end plate 66 is keyed to the shaft, as at 76. A bushing 78, fitted over the shaft and disposed within the blade ring 70, is keyed to the shaft, as at 79. The terminal portion of the shaft extends into the interior of the rotor and is enlarged, as at 80, for a purpose to appear.

Extending into the rotor is a cam shaft 82 having a terminal portion 84 extending into the casing section 14 and affixed thereto by a stud 86 and washer 88. The cam shaft is keyed to the casing section 14, as at 90. An enlarged diameter portion 92 of the cam shaft is disposed adjacent the casing section 14, and interposed between this shaft portion 92, the casing section 14 and the valve plate 22 is an O-ring seal 94. The cam shaft is also provided with portions 96, 98 and 100 successively reduced in diameter. Fitted over the shaft section 100 is a ball bearing unit 102 secured in position by a nut 104 and nested in the terminal portion 80 of the shaft as shown. Fitted over the shaft portions 96 and 98 is a bushing 106 having a radially outwardly extending flange 108 disposed within the blade ring 68, the bushing being keyed to the end plate 64, as at 110. Threaded on the bushing 106 is a nut 112, and housed by the bushing 106 is a roller bearing unit 114. Mounted upon the shaft section 100 are a pair of cams 116 and 118 keyed to the shaft, as at 120.

Carried by the rotor 60 is a set of impeller blade shafts 122, each having fitted over opposite end portions thereof an impeller unit 124 having a base part 126 terminating at one end in a radially outwardly extending flange 128 and terminating at the opposite end in an impeller blade 130. The impeller blade units are keyed to the blade shafts, as at 132, and turnably fitted into the end plates. Interposed between the base of each impeller blade unit and the end plate into which it is turnably fitted is an O-ring 134. The inner peripheries of the two blade rings 68 and 70 and the outer peripheries of the bushing 78 and of the flange 108 of the bushing 106 are provided with arcuate recesses 136 adapted to accommodate the blades 130. The impeller blades 130 are in the form of arcuate fins, the arc, in the specific embodiment illustrated, being about 30 degrees. The narrow opposite side edges of each blade are diametrically opposite one another, and these edges are ground cylindrically, with the axis of the cylindrical surface and of the unit coinciding.

Figure 2:
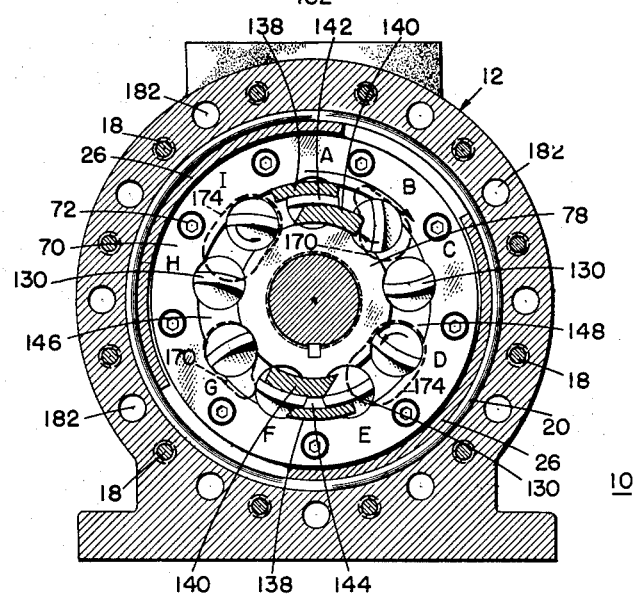
FIGURE 2 is a section on a plane indicated by line 2—2 of FIGURE 1.

The valve plate 22 is provided with arcuately shaped elements 138 and 140 which extend into the annular space bounded by the outer periphery of the bushing flange 108 and the inner periphery of the blade ring 68, and the valve plate 24 is provided with elements 138 and 140 which extend into the annular space bounded by the outer periphery of the bushing 78 and the inner periphery of the blade ring 70. Thus there are formed restricted passages 142 and 144 and chambers 146 and 148. Referring particularly to FIGURE 2, it will be noted that the elements 138 are angularly displaced somewhat in a counterclockwise direction relative to the elements 140.

As shown, end plate 64, flange 108 of bushing 106 and blade ring 68 conjointly make up an end wall having formed therein the annular space aforesaid at the outboard end of the rotor, and having formed therein openings for receiving impeller blade units; and end plate 66, bushing 78 and blade ring 70 conjointly make up an end wall having formed therein the annular space aforesaid at the inboard end of the rotor, and having formed therein openings for receiving impeller blade units. The multipart construction illustrated facilitates fabrication, but it will be apparent that these outboard and inboard end walls might be formed in a different manner, e.g., if desired, each might be formed in one piece.

Each blade shaft has affixed thereto a pinion gear 150 and has slidably fitted thereon an oscillator sleeve 154 provided with a radially outwardly extending terminal portion recessed, as at 155, to accommodate the pinion gear 150. This terminal sleeve portion is in the form of a segment gear 156 intermeshing with the pinion 150 affixed to a next adjacent blade shaft. Axially spaced portions of the sleeve 154 are provided respectively with radially inwardly extending recesses 157 and 158. In the recess 157 is lodged a cam follower 160 mounted upon a pin 162 carried by the sleeve, and in the recess 158 is lodged a cam follower 164 mounted upon a pin 165 carried by the sleeve. In the specific embodiment illustrated, the cam follower rollers 160 and 164 are angularly spaced from one another about the axis of the blade shaft approximately 110 degrees.

The fluid inlet passage comprises an inlet port 166 communicating with an annular space 168 extending about the rotor and with a pair of diametrically opposite arcuate recesses 170 formed in each of the valve plates 22 and 24. The fluid discharge passage comprises a pair of diametrically opposite openings 174 formed in each of the valve plates 22 and 24 and communicating with openings 176 formed in the casing sections 14 and 16. Between each valve plate and the associated casing section, where the openings 174 and 176 register, suitable O-ring seals 178 are provided. The openings 176 communicate with annular channels 180 formed in the casing sections 14 and 16, and these annular channels communicate with one another through a series of passages 182. At the junction of the casing section 12 and each of the casing sections 14 and 16 suitable O-ring seals 183 are provided extending about the passages 182. At the outboard end of the casing the annular channel 180 communicates with a fluid outlet port 184.

In the operation of the motor, fluid under pressure enters the motor through the port 166 and circulates in the space 168 extending about the rotor. From this space 168 the fluid enters the recesses 170 at both the inboard and outboard ends of the motor, from whence it passes into the chambers 146 and 148 and through these chambers to the openings 174. From the openings 174 the fluid passes through the openings 176 into the annular channels 180. The fluid in the inboard channel 180 passes through the several passages 182 to the outboard annular channel 180, from whence all of the fluid is discharged from the motor through the discharge port 184. It will be apparent that as the fluid passes through the chambers 146 and 148, it pushes the impeller blades before it, in consequence of which the rotor is actuated.

Figure 3:
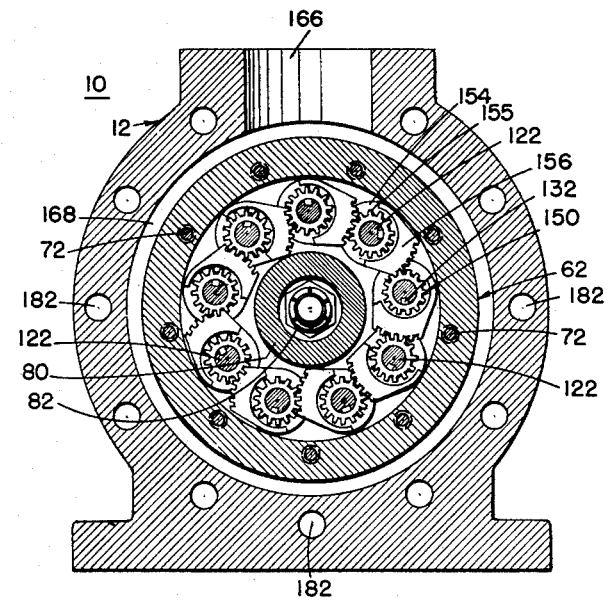
FIGURE 3 is a section on a plane indicated by line 3—3 of FIGURE 1.
Figure 5:
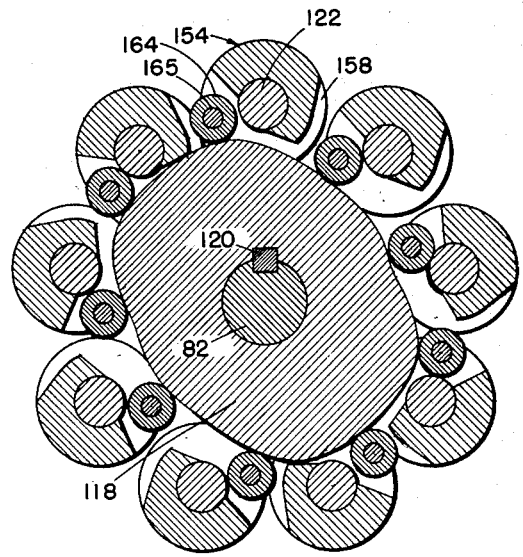
FIGURE 5 is an enlarged section on a plane indicated by line 5—5 of FIGURE 1.
Figure 4:
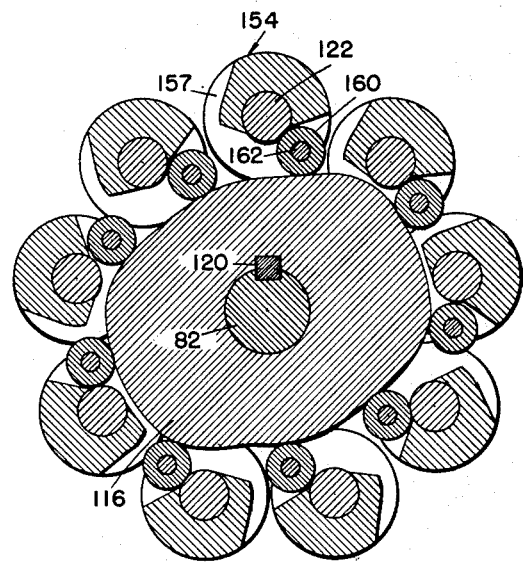
FIGURE 4 is an enlarged section on a plane indicated by line 4—4 of FIGURE 1.
Figure 6:
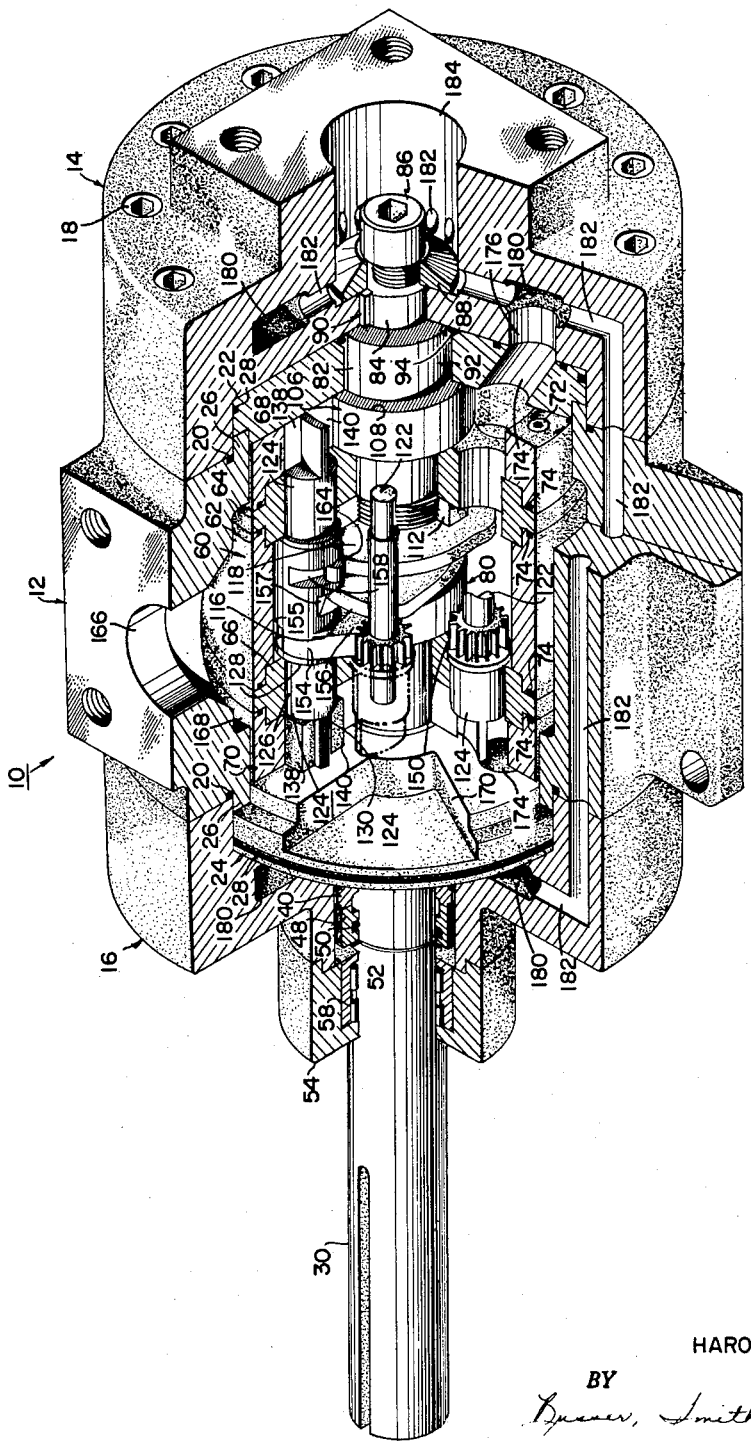
FIGURE 6 is a perspective view of the motor, a quarter section of the outer casing and rotor being cut away to expose the interior thereof.
Figure 7:
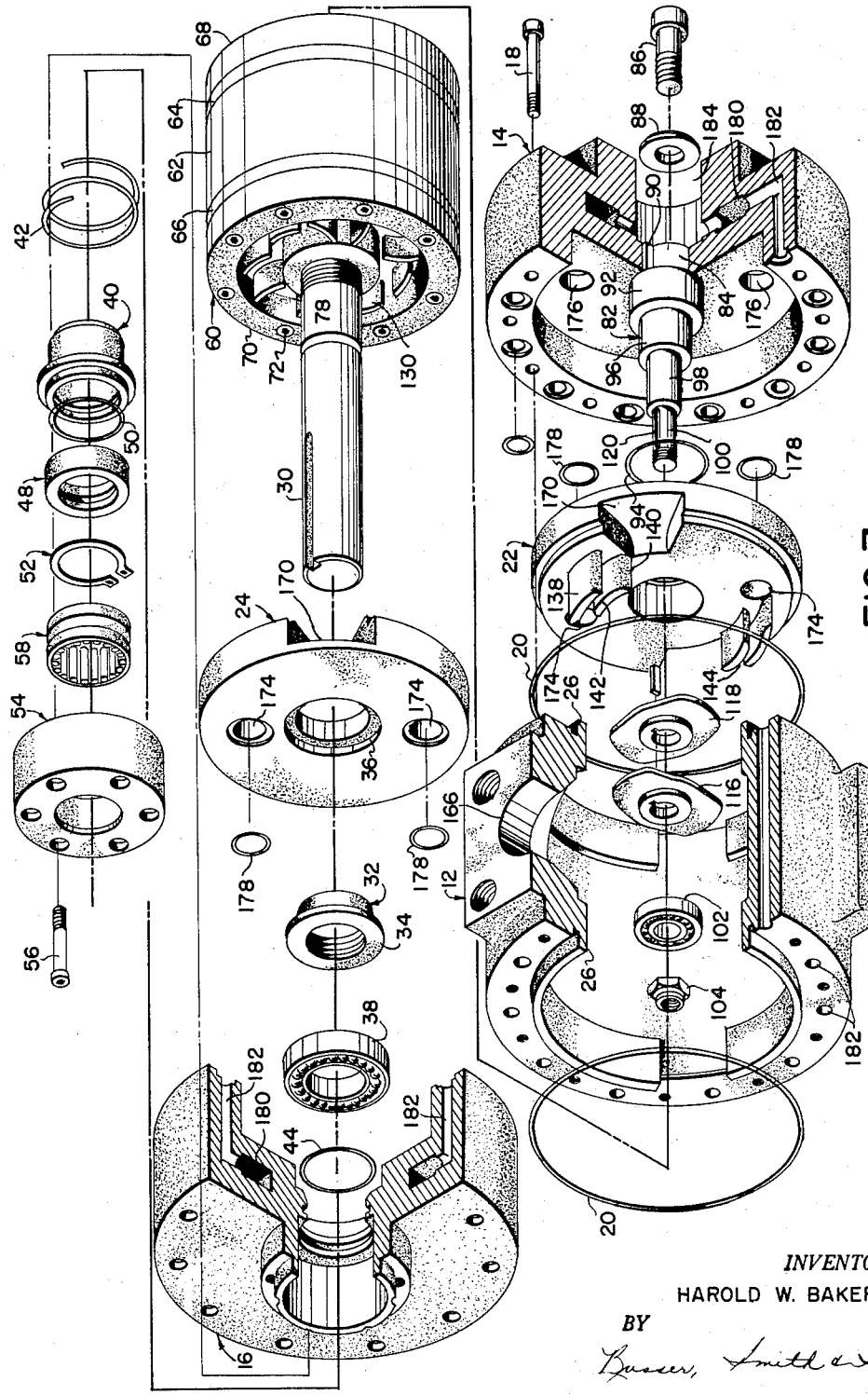
FIGURE 7 is an exploded perspective view of the motor.
Figure 8:
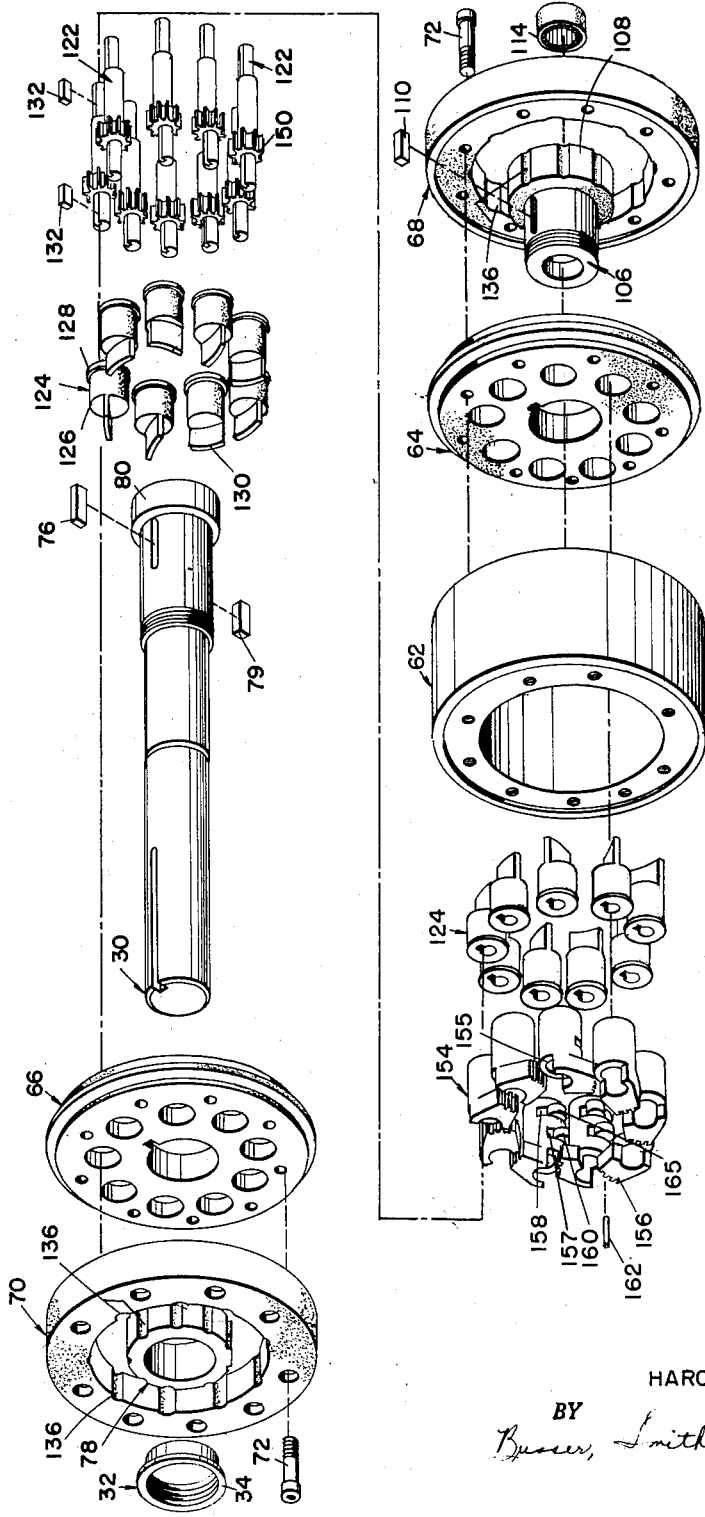
FIGURE 8 is an exploded perspective view of the rotor.

Referring particularly to FIGURES 3, 4 and 5, the cams 116 and 118 are complementary and designed conjointly to positively control the sleeves 154. For this purpose, the cam followers 160 and 164 carried by each sleeve 154 are always engaged respectively with the cams 116 and 118. Each sleeve is freely pivoted upon its blade shaft 122, and the cams 116 and 118 positively control orientation of these sleeves about their blade shafts, while each segment gear 156, meshing with the pinion 150 on a next adjacent blade shaft, controls orientation of the latter and of the blades thereon. The pitch diameter of the segment gear may be larger than the pitch diameter of the pinion gear. If the ratio is 2:1, for example, the sleeve will oscillate through one-half the angle of the blade shaft that mounts the pinion.

Referring to FIGURE 2, rotation of the rotor is clockwise, as indicated by the arrow. The nine significant positions which each blade assumes in one complete revolution of the rotor are shown. In position A the impeller blade obstructs the restricted passage 142 and prevents communication between the chambers 146 and 148 through the restricted passage 142. In position B the blade has rotated clockwise somewhat from the fully feathered position shown at A to a partially unfeathered position. In position C the blade has turned clockwise to fully unfeathered, working position. In position D the blade is still in working position and is about to turn counterclockwise. In position E the blade is fully feathered and is about to enter the restricted passage 144. In position F the blade is still feathered and is passing out of the restricted passage 144. It will be noted that there is no communication between the chambers 146 and 148 through the restricted passage 144. In position G the blade is in fully unfeathered, working position. In position H the blade is still in working position and is about to rotate counterclockwise. In position I the blade has turned counterclockwise somewhat and is in partially feathered position. Between positions I and A, the blade turns still farther counterclockwise to its initial feathered position and again enters the restricted passage 142.

It will be noted that the blades act successively to block the restricted passages 142 and 144, never allowing communication between the chambers 146 and 148.

Referring particularly to the right-hand side of the motor as viewed in FIGURE 2, fluid enters the chamber 148 at the upper end of the chamber, through the recess 170, shown by broken lines, proximate the restricted passage 142. Acting against the blades in positions C and D, it turns the rotor and is discharged from the lower end of the chamber 148, through the opening 174, shown in broken lines, proximate the restricted passage 144.

Now referring to the left-hand half of the motor as viewed in FIGURE 2, fluid enters the chamber 146 at the lower end thereof, through the recess 170 proximate the restricted passage 144, acting against the blades in positions G and H, turns the rotor and is discharged from the upper end of the chamber 146, through the opening 174 proximate the restricted passage 142.

It will be understood that the valve plates 22 and 24 are so oriented with respect to one another that the pair of recesses 170 formed in the plate 22 are aligned respectively with the pair of recesses 170 formed in the plate 24, and the pair of openings 174 formed in the plate 22 and aligned respectviely with the pair of recesses 174 formed in the plate 24. Thus not only is the fluid pressure acting at each end of the rotor radially balanced, but the fluid pressure acting axially against one end of the rotor is balanced by the fluid pressure acting axially against the opposite end of the rotor.

It will be apparent that the motor may be reversed by merely reversing the flow of fluid under pressure. In addition, the motor may be employed as a pump as well as a motor, and the motor or pump will operate with fluids which are either liquids or gases, as, for example, oil, water, air, etc. When emyloyed as a pump, the device is actuated by power applied to the shaft 30. Fluid to be pumped moves along the path already indicated, but the direction of flow will depend upon the direction in which the shaft 30 is turned. It will be understood that in this case the fluid passes through the chambers 146 and 148 by reason of being pushed by the impeller blades 130.

To facilitate assembly and assure proper operation of a motor or pump unit, suitable clearances must be allowed between parts that are to move relative to each other. These clearances may be very small, but nevertheless they give rise to a certain amount of movement of the impeller blades about the axes of their blade shafts. In high pressure units this movement, known as back-lash, must be controlled and reduced to a minimum or preferably eliminated altogether. To this end, the arcuately-shaped elements 138 and 140 which form the restricted passages 142 and 144 may assume the modified forms thereof shown in FIGURES 9 and 10, the modified arcuately-shaped elements being designated respectviely 200 and 202. As viewed in these figures, the element 200 is flattened, as at 204, to provide an axially extending feathered right-hand end portion 206 overlying the outer surface of the element 202. The element 200 is also flattened at 208 and rounded at 210 to provide an axially extending feathered left-hand end portion 212. The element 202 is flattened, as at 214, to provide an axially extending feathered left-hand end portion 216 underlying the inner surface of the element 200, and rounded, as at 218, to provide an axially extending rounded right-hand end portion 220.

Referring particularly to FIGURE 9, it will be evident that as the impeller blade 130 approaches the restricted passage 142, it turns in the direction of the arrow counterclockwise about the axis of its shaft. In passing the feathered end 212 of the element 200 the convex surface of the impeller blade slides under the rounded surface 210 of the element 200 in contact therewith, completing the feathering action before blade 130 enters the restricted passage 142.

Now referring particularly to FIGURE 10, it will be evident that as the impeller blade 130 approaches the restricted passage 142 from the opposite direction, it turns in the direction of the arrow counterclockwise about the axis of its shaft. In passing the rounded end 220 of the element 202 the concave surface of the impeller blade slides over the rounded surface 218 of the element 202 in contact therewith. Thus, the impeller blade is indexed with such accuracy that back-lash, if not eliminated altogether, is reduced to a bare minimum.

Figure 13:
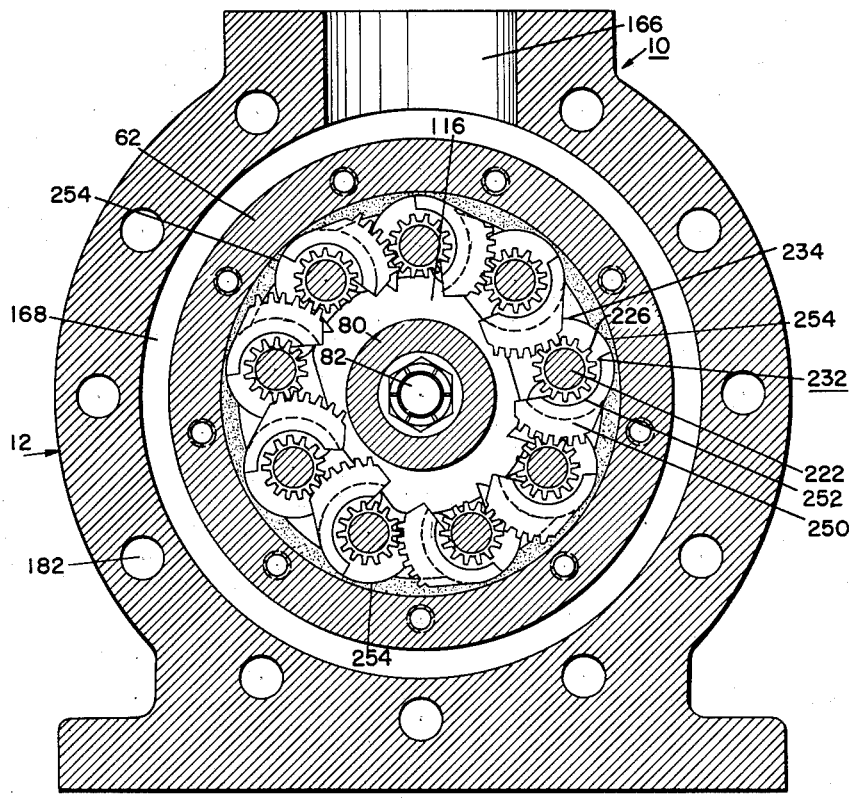
FIGURE 13 is similar to FIGURE 3, but shows the impeller blade shafts and sleeves illustrated in FIGURES 11 and 12.

Referring particularly to the modifications shown in FIGURES 11, 12 and 13, the impeller blades are formed integrally with the impeller blade shaft. The shaft, designated 222, has formed thereon a pair of axially spaced radially outwardly extending flanges 224. Close adjacent one of these flanges is a pinion gear 226. At each end of the shaft is an impeller blade unit having a base part 228 and a blade part 230. Embracing the shaft 222 is a sleeve 232 of a length to fit between the flanges 224. On one side of the sleeve, throughout the major portion of its length, the outer surface of the sleeve is round, as at 234. The opposite side of the sleeve is open, as at 236, for receiving the shaft 222. The sleeve is also provided with a cross-axially extending opening 238 in which is lodged a cam follower roller 240 mounted upon a pin 242, and with a cross-axially extending opening 244 in which is lodged a cam follower roller 246 mounted upon a pin 248. Adjacent the opening 244 is a radially extending gear segment 250 recessed, as at 252, for receiving the pinion gear 226.

Referring particularly to FIGURE 13, it will be noted that the central rotor section 62 is provided internally with a series of angularly spaced arcuate recesses 254, in each of which recesses is nested the round back 234 of a sleeve 232. Thus the several sleeves 232 are oscillatably carried by the shafts 222. A further detailed discussion is deemed to be unnecessary for a full understanding of the invention.

Figure 14:
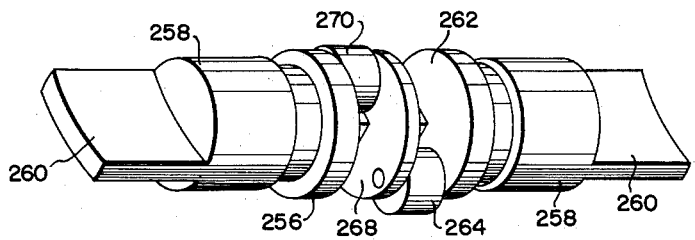
FIGURE 14 is a perspective view of another modified form of the impeller blade and shaft.
Figure 16:
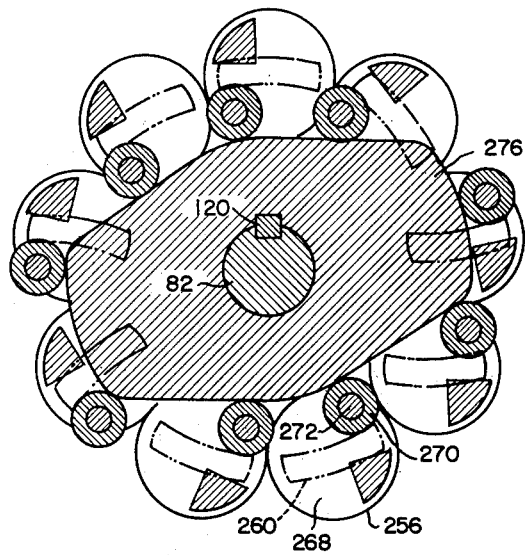
FIGURES 15 and 16 are similar to FIGURES 4 and 5, but show the impeller blade and shaft illustrated in FIGURE 14.
Figure 15:
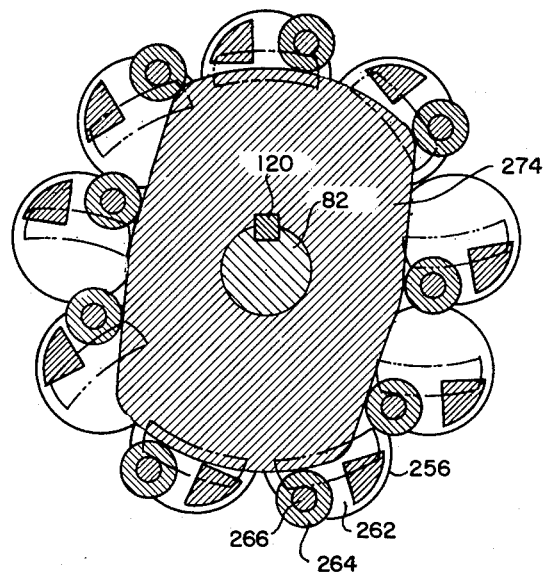

FIGURES 14, 15 and 16 illustrate a modification in which each sleeve and its associated impeller blades are formed integral with their shaft, and in which orientation of the impeller blades is effected directly, without the use of gearing. Referring particularly to FIGURE 14, at each end of the shaft, designated 256, is an impeller blade unit having a body 258 and a blade part 260. The shaft is provided with a cross-axially extending opening 262 in which is lodged a cam follower roller 264 mounted upon a pin 266, and with a cross-axially extending opening 268 in which is lodged a cam follower roller 270 mounted upon a pin 272.

Referring particularly to FIGURES 15 and 16, the several shafts 256 and their impeller blades 260 are shown in the various significant positions through which each passes during a single revolution of the rotor. At all times each shaft and its impeller blades are positively oriented directly by a pair of cams, designated 274 and 276, respectively engaging the cam follower rollers 264 and 270. A more detailed description of this modification is deemed to be unnecessary for a full understanding of the invention.

Figure 17:
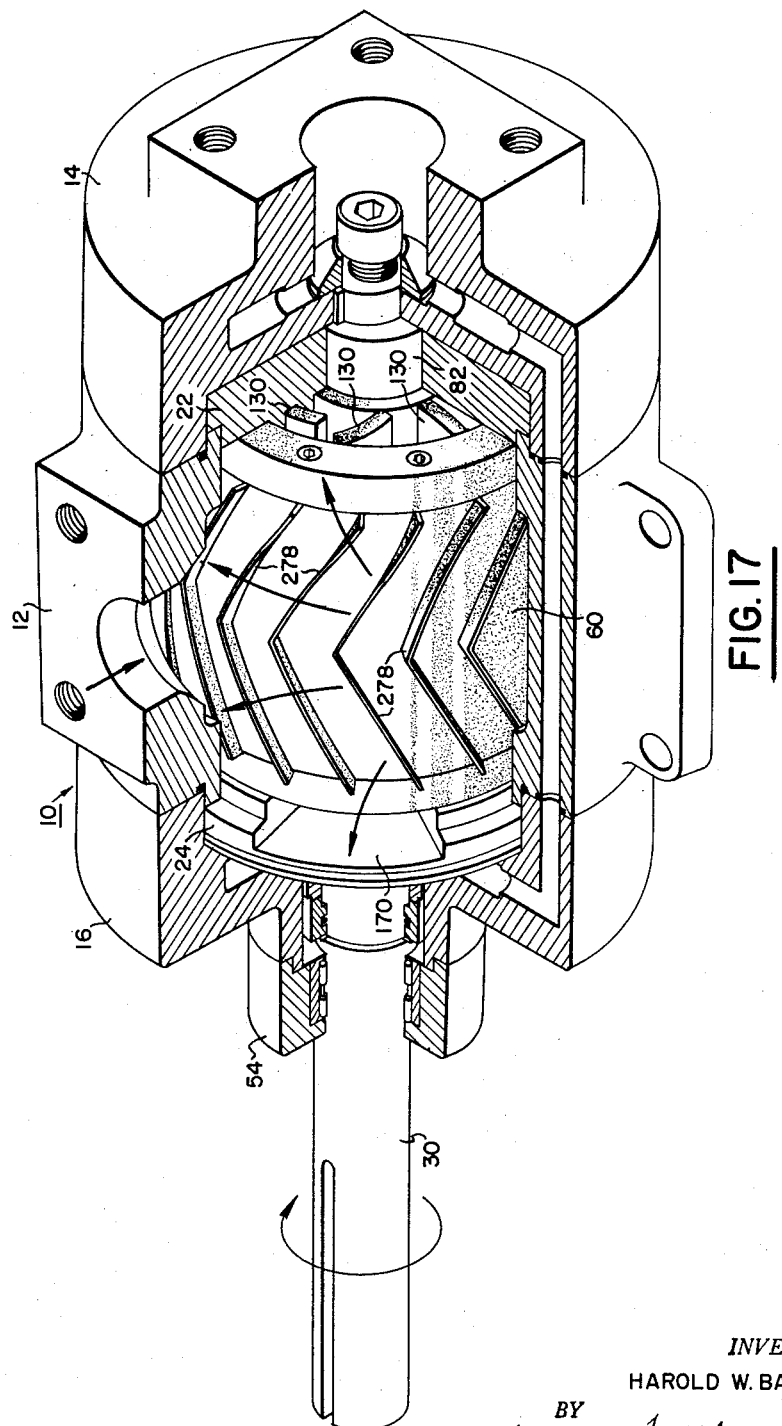
FIGURE 17 is a perspective view of a rotary pump, a quarter section of the outer casing being broken away to expose fins carried by the rotor.

When acceleration of the liquid being pumped is too rapid, cavitation takes place, i.e., vapors of the liquid form pockets in the liquid that preclude efficient pumping action. FIGURE 17 illustrates a modification in which the rotor is provided with means for preventing too rapid acceleration of the liquid being pumped. The means aforesaid are V-shaped fins, designated 278, circumferentially spaced about the rotor. All of the fins 278 present in the same direction and they are accommodated in the annular space 168 extending about the rotor.

In the absence of such fins, the velocity of the liquid when it reaches the impeller blades would be the same as the velocity of the liquid as it enters the casing at 166. Under the influence of the fins 278, which turn with the rotor, the velocity of the liquid entering at 166 is increased before it reaches the impeller blades so that acceleration of the liquid is not too rapid and cavitation does not occur. The direction of liquid flow is indicated by arrows.

Referring again to operation of the motor, and particularly to the right-hand side of the motor, as viewed in FIGURE 2, at position B, i.e., at the inlet port or recess 170, the impeller blade is turning about its own central axis from feathered to working position. Between positions C and D, i.e., between the inlet port 170 and discharge port 174, the blade does not turn about its axis, i.e., it dwells in working position. Between positions D and E, i.e., at the discharge portion 174, the blade turns about its axis from working to feathered position. Between positions E and F the blade dwells in feathered position while passing through the restricted passage 144.

Now referring particularly to the left-hand side of the motor, as viewed in FIGURE 2, between positions F and G, i.e., at the inlet port 170, the blade turns about its axis from feathered to working position. Between positions G and H, i.e., between the inlet port 170 and the discharge port 174, the blade dwells in working position. Between positions H and A, i.e., at the discharge port 174, the blade turns from working position to feathered position. Between positions I and B the blade dwells while passing through the restricted passage 142.

Thus while the blades and the shafts upon which they are mounted orbit continuously about the central axis of the rotor, the turning movement of an impeller blade about the axis of the shaft upon which it is mounted is intermittent, the arrangement being such that the blade feathers or unfeathers only when it is opposite an inlet or an outlet port, and dwells when it is between said ports. The advantages stemming from such an arrangement are important.

When the unit is being used as a pump, the fluid pressure at a discharge port 174, between positions E and D, for example, is maximum. The fluid pressure between positions C and D is somewhat lower, and that between positions C and B is still lower, in consequence of which the tendency is for fluid to leak past the blades that are in working position from the discharge port 174 toward the inlet port 170. Therefore, the long leakage paths provided by the opposite side edges of the relatively thick blades are of prime importance. The substantial contacting surface areas provide an excellent seal against the fluid leakage caused by the back pressure aforesaid.

In addition, since there is considerable difference between inlet and discharge fluid pressures, and since there is an inlet port 170 at one end and a discharge port 174 at the opposite end of each restricted passage 142 and 144, there is a tendency for fluid to leak through a restricted passage from the high pressure toward the low pressure end thereof. Therefore, the dwelling of a blade during its passage through a restricted passage is of prime importance because it permits the restricted passage to be made substantial in length. The broad sides of the blades, as they pass through the restricted passage in contact with the walls thereof, provide very effective long leakage paths and the substantial contacting surface areas provide an excellent seal against fluid leakage.

Since an impeller blade feathers or unfeathers only when it is opposite an inlet or discharge port, and since fluid pressure on one side of a blade, when it is in the vicinity of an inlet or a discharge port, is equal and opposite to the fluid pressure on the opposite side of the blade, a blade is feathered or unfeathered under minimum load conditions. As indicated, a blade dwells while in working position. Thus it is not unnecessarily loaded during the pumping operation.

It will be understood, of course, that the present invention is susceptible of various modifications which may be made without departing from the general principles of the invention. Accordingly, it is intended to claim the same broadly as well as specifically, as indicated by the appended claims.

What is claimed is:

1. A pump-motor comprising a casing, a hollow rotor within said casing having a transversely extending end wall, a plurality of rockably mounted shafts carried by said rotor, impeller blades mounted upon said shafts, means cooperating with said end wall to form an endless channel, a valve segment extending into said channel to form in said channel a chamber extending on either side of the valve segment, means providing fluid inlet and discharge passages communicating with said chamber, a pair of stationary parallel cams mounted within said rotor, means operatively interposed between said cams and each of said shafts including a pair of spaced cam followers in continuous engagement with the cams respectively, said means operatively interposed between said cams and each of said shafts being responsive to said cams for rocking said shafts when they are moved about the cams by the rotor thereby to turn each blade for movement thereof past said valve segment with a narrow edge thereof leading and to turn said blade after passing the valve segment for movement through said chamber with a broad side leading.

2. The combination comprising a casing, an elongated hollow cylindrical rotor within said casing having a pair of transversely extending opposite end walls, a plurality of shafts within said rotor each having opposite end portions rockably journalled respectively in said end walls, a pair of impeller blades respectively mounted upon opposite end portions of each shaft, the blades at each end of said rotor extending axially into an annular channel formed in the associated end wall, stationary means carried by said casing and extending into each of said channels and providing at least one restricted passage and a corresponding number of chambers communicating with each other, a pair of reciprocal cams stationarily mounted centrally within said rotor, a driven gear affixed to each of said shafts, a sleeve member slidably fitted over each of said shafts for being rocked relative thereto including a drive gear intermeshed with the driven gear affixed to an adjacent shaft, a pair of cam follower rollers carried by said sleeve member and engaging respectively said pair of cams, said cams being conjointly operative for positively controlling rocking movements of said sleeve member in both directions and each of said rockable sleeves being responsive to said cam means for rocking said adjacent shaft when said shafts are moved about said cam means by said rotor thereby to turn each blade for movement thereof through its associated restricted passages with a narrow edge thereof leading and to turn said blade, after it emerges from its associated restricted passages, for movement thereof through its associated chambers with a broad side thereof leading, and means providing fluid inlet and discharge passages communicating with each chamber aforesaid.

3. The combination comprising a casing, an elongated hollow rotor within said casing having a transversely extending end wall, a plurality of rockably mounted shafts carried by said rotor, impeller blades mounted upon said shafts, said end wall having an endless channel for the reception of said impeller blades, stationary means extending axially into said channel and providing at least one restricted passage and a corresponding number of chambers communicating with each other, stationary reciprocal cam means within said rotor, means operatively interposed between said cam means and shafts, carried by said shafts and responsive to said cam means for rocking said shafts when they are moved about said cam means by said rotor thereby to turn each blade for movement thereof through said restricted passage with a narrow edge thereof leading and to turn said blade, after it emerges from said restricted passage, for movement thereof through said chamber with a broad side thereof leading, means providing fluid inlet and discharge passages communicating with said chamber, said first mentioned stationary means including cam means independent of said blade turning means and operative for engaging and camming each impeller blade, as it approaches and turns into said restricted passage, thereby to index the same and eliminate back-lash.

4. The combination comprising a casing, an elongated hollow rotor within said casing having a transversely extending end wall, a plurality of rockably mounted shafts carried by said rotor, a pair of spaced cam followers connected to each shaft, impeller blades mounted upon said shafts, said end wall having an endless channel for the reception of said impeller blades, stationary means extending into said channel from the outer side of said end wall and forming in said channel a chamber and a restricted passage communicating with said chamber, stationary reciprocal cam means within said rotor acting upon the cam followers connected to each of said shafts independently of the cam followers connected to the other shafts for rocking said shafts when they are moved about said cam means by said rotor thereby to turn each blade for movement thereof through said restricted passage with a narrow edge thereof leading and to turn said blade, after it emerges from said restricted passage, for movement thereof through said chamber with a broad side thereof leading, and means providing fluid inlet and discharge passages communicating with said chamber.

5. In a pump, the combination comprising a casing, an elongated hollow rotor within said casing having a transversely extending end wall, a plurality of rockably mounted shafts carried by said rotor, impeller blades mounted upon said shafts, said end wall having an endless channel for the reception of said impeller blades, stationary means extending into said channel from the outer side of said end wall and forming in said channel a chamber and a restricted passage communicating with said chamber, stationary reciprocal cam means within said rotor, means operatively interposed between said cam means and shafts and responsive to said cam means for rocking said shafts when they are moved about said cam means by said rotor thereby to turn each blade for movement thereof through said restricted passage with a narrow edge thereof leading and to turn said blade, after it emerges from said restricted passage, for movement thereof through said chamber with a broad side thereof leading, means providing fluid inlet and discharge passages communicating with said chamber, and means operatively interposed between said fluid inlet means and impeller blades for accelerating said liquid including fins mounted upon said rotor for rotation therewith.

6. In a pump, the combination comprising a casing, an elongated hollow cylindrical rotor within said casing, a plurality of shafts within and carried by said rotor and having corresponding end portions rockably journalled respectively in transversely extending opposite end walls of said rotor, impeller blades mounted upon said shafts and extending axially into a pair of annular channels formed respectively in said end walls, stationary means carried by said casing and extending into each of said channels to provide at least one restricted passage and a corresponding number of chambers therein communicating with each other, reciprocal cam means stationarily mounted centrally within said rotor, means operatively interposed between said cam means and shafts and responsive to said cam means for rocking said shafts when they are moved about said cam means by said rotor thereby to turn each blade for movement thereof through said restricted passages with a narrow edge thereof leading and to turn said blade, after it emerges from said resrticted passages, for movement thereof through said chambers with a broad side thereof leading, means providing fluid inlet and discharge passages communicating with each chamber aforesaid, and means operatively interposed between said fluid inlet means and impeller blades for accelerating said liquid including fins circumferentially spaced about said rotor and extending lengthwise thereof and radially outwardly therefrom.

7. A pump-motor comprising a casing, a hollow rotor within said casing having a transversely extending end wall, a plurality of rockably mounted shafts carried by said rotor, impeller blades mounted upon said shafts, means cooperating with said end wall to form an endless channel for the reception of said blades, stationary means extending into said channel to form in said channel a chamber and a restricted passage, means providing fluid inlet and discharge passages communicating with said chamber, a pair of stationary parallel cams mounted within said rotor and substantially perpendicular to the axis of the rotor, means operatively interposed between said cams and said shafts including a member for each shaft having a pair of spaced cam followers in continuous engagement with the cams respectively, said members being responsive to said cams for rocking said shafts when they are moved about the cams by the rotor thereby to turn each blade for movement thereof through said restricted passage with a narrow edge thereof leading and to turn said blade after emerging from said restricted passage for movement through said chamber with a broad side leading.

8. A pump-motor in accordance with claim 7 in which each said member is recessed on the leading and trailing sides of each of its cam followers to accommodate the cams.

9. A pump-motor comprising a casing, a hollow rotor within said casing having a transversely extending end wall, a plurality of rockably mounted shafts carried by said rotor, a gear fixed to each of said shafts and lying within said rotor, impeller blades mounted upon said shafts, means cooperating with said end wall to form an endless channel for the reception of said blades, stationary means extending into said channel to form in said channel a chamber and a restricted passage, means providing fluid inlet and discharge passages communicating with said chamber, a pair of stationary parallel cams mounted within said rotor and substantially perpendicular to the axis of the rotor, means operatively interposed between said cams and said shafts including a member for each shaft having a pair of spaced cam followers in continuous engagement with the cams respectively, each said member being freely rockable on one of said shafts and having a gear engaging the gear on an adjacent shaft and each said member being rocked on its associated shaft by the cams when the shafts are moved about the cams by the rotor thereby through its gear and the gear on the adjacent shaft to turn the blade on the said adjacent shaft for movement thereof through said restricted passage with a narrow edge thereof leading and to turn said blade after emerging from said restricted passage for movement through said chamber with a broad side leading.

10. A pump-motor in accordance with claim 9 in which each member is recessed on the leading and trailing sides of its cam followers to accommodate the cams.

References Cited in the file of this patent

UNITED STATES PATENTS

| | | |
|---|---|---|
| 619,730 | Dobbin | Feb. 21, 1899 |
| 738,101 | Curtis | Sept. 1, 1903 |
| 1,096,804 | Eggleton | May 12, 1914 |
| 1,795,579 | Storey | Mar. 10, 1931 |
| 1,831,263 | Ross | Nov. 10, 1931 |
| 1,989,900 | Vickers | Feb. 5, 1935 |
| 2,411,602 | Tweedale | Nov. 26, 1946 |